United States Patent
Hepner et al.

(10) Patent No.: US 6,167,690 B1
(45) Date of Patent: Jan. 2, 2001

(54) CONTROL SYSTEM FOR CONTROLLING AT LEAST ONE VARIABLE OF A PROCESS AS WELL AS A USE OF SUCH A CONTROL SYSTEM

(75) Inventors: Stephan Hepner, Althäusern; Andrew Wihler, Ennetbaden, both of (CH)

(73) Assignee: Asea Brown Boveri AG, Baden (CH)

( * ) Notice: Under 35 U.S.C. 154(b), the term of this patent shall be extended for 0 days.

(21) Appl. No.: 09/110,898

(22) Filed: Jul. 7, 1998

(30) Foreign Application Priority Data

Jul. 11, 1997 (EP) .................................................. 97810463

(51) Int. Cl.[7] ........................................................ F02C 9/00
(52) U.S. Cl. .......................................... 60/39.03; 60/39.27
(58) Field of Search ............................... 60/39.03, 39.27, 60/39.2; 431/2, 18

(56) References Cited

U.S. PATENT DOCUMENTS

| | | |
|---|---|---|
| 4,066,958 | 1/1978 | Burke, Jr. . |
| 4,639,854 | 1/1987 | Kurokawa et al. . |
| 5,487,265 * | 1/1996 | Rajamani et al. ................... 60/39.27 |
| 5,622,042 * | 4/1997 | Mirsky et al. ....................... 60/39.03 |
| 5,636,507 * | 6/1997 | Rajamani et al. ................... 60/39.27 |
| 5,704,205 * | 1/1998 | Hepner et al. ....................... 60/39.27 |
| 5,732,546 * | 3/1998 | Pineo et al. ......................... 60/39.03 |
| 5,761,895 * | 6/1998 | Chu et al. ............................ 60/39.03 |

FOREIGN PATENT DOCUMENTS

| | | |
|---|---|---|
| 0358139A2 | 3/1990 | (EP) . |
| 2694822 | 2/1994 | (FR) . |
| WO81/00452 | 2/1981 | (WO) . |
| WO88/02882 | 4/1988 | (WO) . |

* cited by examiner

*Primary Examiner*—Charles G. Freay
(74) *Attorney, Agent, or Firm*—Burns, Doane, Swecker & Mathis, L.L.P.

(57) ABSTRACT

In a control system for controlling at least one variable ($TIT_m$) of a process, the at least one variable ($TIT_m$) being calculated from a multiplicity of measured process variables ($TAT_m$, $p_{Cm}$), the measured process variables ($TAT_m$, $p_{Cm}$) in each case being measured via associated measuring sections (18, 19), the transfer functions ($G_2(s)$, $G_1(s)$) of which have a different time response, an improvement in particular during transient actions is achieved in that, to avoid instability, correction means (21) which equalize the different time responses of the individual measuring sections (18, 19) are provided.

11 Claims, 4 Drawing Sheets

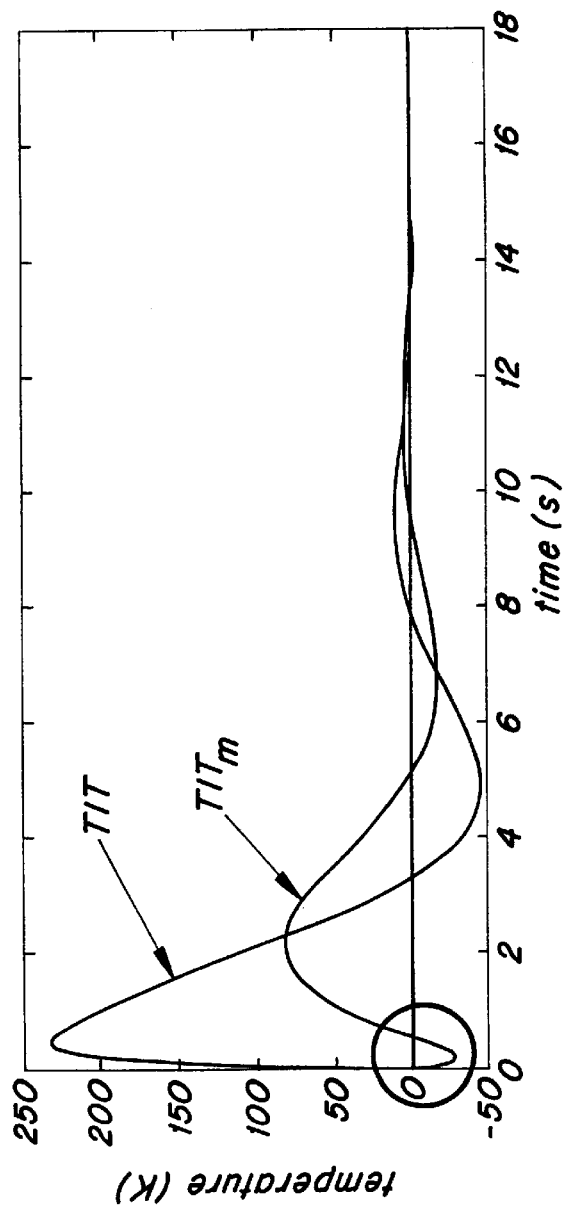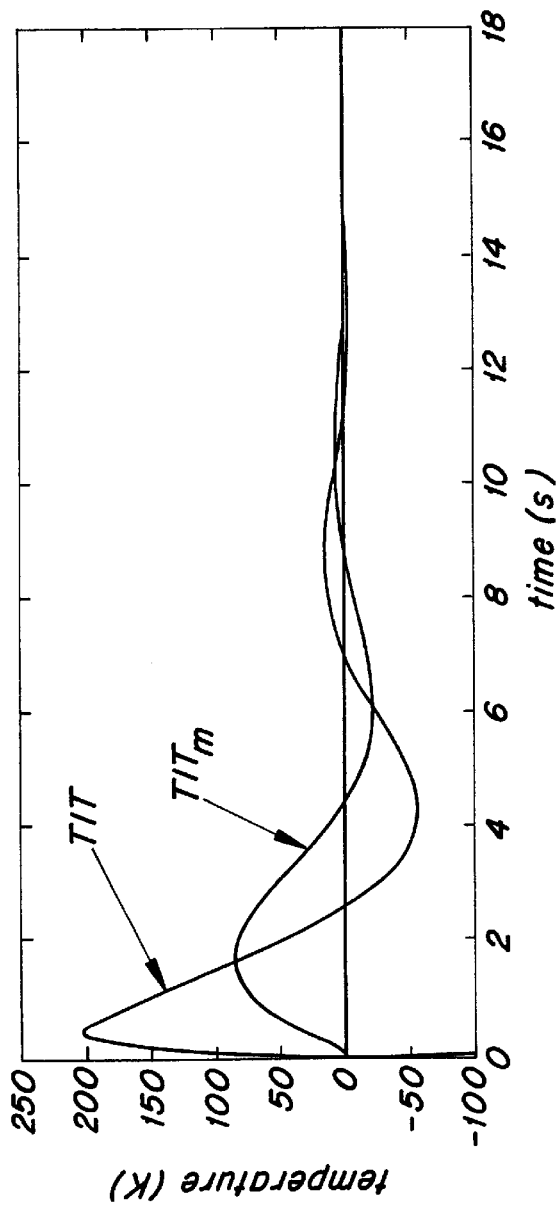

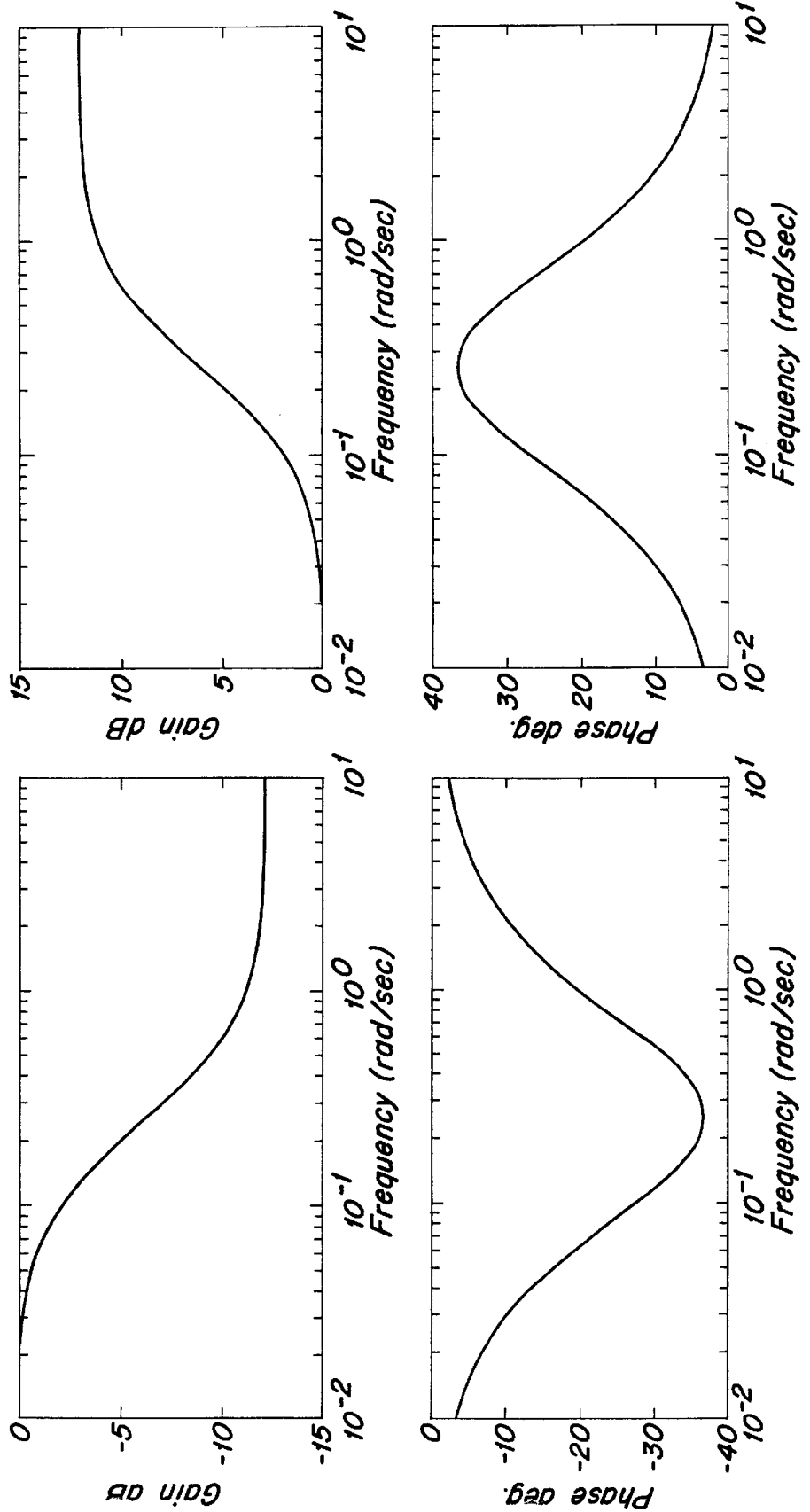

CONTROL SYSTEM FOR CONTROLLING AT LEAST ONE VARIABLE OF A PROCESS AS WELL AS A USE OF SUCH A CONTROL SYSTEM

BACKGROUND OF THE INVENTION

1. Field of the Invention

The invention relates to the field of control technology. It relates to a control system for controlling at least one variable of a process, the at least one variable being calculated from a multiplicity of measured process variables, the measured process variables in each case being measured via associated measuring sections, the transfer functions of which have a different time response.

2. Discussion of Background

In the control and monitoring of gas turbines (GTs), information on the multiplicity of thermodynamic variables, such as, for example, pressures, temperatures and mass flows, is required. In this case, however, there are important process variables which cannot be measured directly with sufficient accuracy and reliability at reasonable costs. Such process variables therefore have to be determined on the basis of auxiliary measurements and known relationships (on the basis of physical laws and experimental data) which link the auxiliary measurements to the desired process variables.

A typical example of such an indirectly determined process variable is the turbine inlet temperature (TIT) of a gas turbine. The conditions at the turbine inlet do not permit an efficient temperature measurement at this location. The local temperatures are too high and lead to a very short service life and high failure rates. Direct measurements of the TIT are therefore avoided. Instead, the TIT is calculated from the (lower) turbine outlet temperature (TAT) and the pressure at the compressor outlet ($p_C$), both of which are comparatively easy to measure. A typical closed-loop control circuit for the TIT of a gas turbine with the associated measuring sections is reproduced schematically in FIG. 1. The gas turbine 10 comprises a compressor 12, a burner 13 and a following turbine 14. Connected upstream of the compressor are adjustable inlet guide vanes 11. A temperature controller 15 controls the turbine inlet temperature TIT according to a preset desired value $TIT_c$. It influences the process in the gas turbine 10 by virtue of the fact that it adjusts the inlet guide vanes 11 via a first control line 16 and thus controls the combustion air, and sets the mass flow of the fuel to the burner 13 via a second control line 17. The turbine outlet temperature TAT is measured via a first measuring section 18 (transfer function $G_1(s)$), and the pressure $p_C$ at the compressor outlet is measured via a second measuring section 19 (transfer function $G_2(s)$). The measured values $p_{Cm}$ and $TAT_m$ are transmitted to a computing unit 20, which, with the aid of a relationship, expressed as a formula, between $p_C$, TAT and TIT, calculates the (indirectly) measured value $TIT_m$ of the turbine inlet temperature and feeds it back to the temperature controller 15 for comparison with the desired value $TIT_c$.

The following general statements can be applied to the relationship expressed as a formula and used in the computing unit 20: if y designates the process variable which cannot be measured directly, and if $x=x_1, x_2, \ldots$ denotes a set of measurable process variables (auxiliary variables) from which y can be calculated, an algebraic expression of the following form applies in the simplest case between the variables:

$$y=f(X). \tag{1.1}$$

For the turbine inlet temperature TIT, this algebraic expression has the form of the so-called TIT formula, which in the basic form is:

$$TIT=f(TAT,p_C). \tag{1.2}$$

In practice, the formula is additionally dependent on ambient conditions and other variables, which in the present discussion are considered to be constant and are therefore not explicitly specified.

The evaluation of the formula (1.1) is based on measurements $X_m=x_{1m}, x_{2m}, \ldots$ and leads to a value $Y_m$. The variable $$y_m=f(x_{1m},x_{2m}, \ldots) \tag{1.3}$$

is designated as pseudo measurement of y, because it is not directly measured but is calculated from auxiliary measurements $X_m$. As an example, the pseudo measurement $TIT_m$ of the turbine inlet temperature TIT may be mentioned here and this is expressed according to the TIT formula (1.2) as follows:

$$TIT_m=f(TAT_m,p_{Cm}) \tag{1.4}$$

where $TAT_m$ and $p_{Cm}$ designate the corresponding measurements of TAT and $p_C$.

The accuracy of the pseudo measurement $y_m$ is determined by the measuring error:

$$e_y=y_m-y. \tag{1.5}$$

This measuring error depends on the accuracy of the measurements $X_m$. In order to obtain an acceptable accuracy of $y_m$, the relationship (1.3) is normally calibrated at various steady-state working points of the gas turbine 10. Unfortunately, even a perfect steady-state calibration cannot prevent a poor control quality from resulting when pseudo measurements $y_m$ are used in dynamic closed loops (as that represented in FIG. 1) during transient actions. Precisely in the case of the control or monitoring of the turbine inlet temperature TIT, this may result in risks for the gas turbine, since thermal overloading may occur.

The main reason for this problem may be traced to the different dynamic properties of the measuring sections (18, 19 in FIG. 1) which are linked to the auxiliary variables (TAT, $p_C$ in FIG. 1). In the case of the TIT formula (1.2), the dynamics of the thermocouples which are normally used to measure the turbine outlet temperature TAT are generally very much lower than those of the pressure sensors which measure the pressure PC at the compressor outlet. As a result, the measurements $TAT_m$ and $p_{Cm}$ are not synchronous, and a pseudo-measured $TIT_m$ transient according to the formula (1.4) may then deviate considerably from the actual relationship according to formula (1.2), even in the event of the steady-state accuracy being high (for this see as an example the representation in FIG. 2, from which it can be seen that, as a consequence of non-synchronized measurements $TAT_m$ and $p_{Cm}$, the pseudo measurement $TIT_m$ calculated therefrom may have a considerable phase error (circled) compared with the actual value TIT).

It goes without saying that the problems of the pseudo measurement which are discussed here using a gas turbine as an example may also occur during other measurements, processes or process control actions and may lead to adverse consequences.

SUMMARY OF THE INVENTION

Accordingly, one object of the invention is to provide a novel control system in which the different dynamic or time response of the measuring sections used has virtually no adverse effect on the stability and accuracy of the control during both steady-state and transient actions.

The object is achieved in the case of a control system of the type mentioned at the beginning in that, to avoid instability, correction means which equalize the different time responses of the individual measuring sections are provided. The essence of the invention, therefore, consists in correcting the unequal time responses of the individual measuring sections in such a way that the corrected measuring sections have the same time response.

A first preferred embodiment of the control system according to the invention is defined in that the correction means comprise one or more correction elements which are arranged downstream of the measuring sections and correct the time response of the individual measuring sections. In this way, it becomes possible to specifically correct the time response of each individual measuring section in such a way that virtually synchronous provision of the measured values is obtained overall for the calculation of the control variable.

This correction is preferably carried out in such a way that each of the correction elements has a transfer function which, together with the transfer function of the associated measuring section, produces an overall transfer function which is at least approximately the same for all the process variables to be measured.

Furthermore, according to the invention, such a control system is used for controlling the turbine inlet temperature of a gas turbine which comprises a compressor, a burner and a following turbine. The correction becomes especially simple if, in a preferred embodiment, the calculated turbine inlet temperature is calculated from a turbine outlet temperature, measured via a first measuring section, and from a pressure, measured via a second measuring section, at the compressor outlet, if the correction means comprise a correction element which is connected downstream of the second measuring section, if the first measuring section has a first transfer function, if the second measuring section has a second transfer function, and if the correction element has a third transfer function which is obtained as a quotient of the first and second transfer function.

Further embodiments follow from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a possible phase error in the case of the calculated turbine inlet temperature $TIT_m$ in an uncorrected control system according to FIG. 1;

FIG. 3 shows the calculated turbine inlet temperature $TIT_m$ comparable with FIG. 2 after a correction, according to the invention, of the control system;

FIG. 4 shows the transfer characteristics (damping and phase displacement as a function of the frequency) of a correction element with low-pass character in a preferred embodiment of the invention;

FIG. 5 shows the transfer characteristics (damping and phase displacement as a function of the frequency) of a correction element with high-pass character, as can also be used in principle within the scope of the invention for the synchronization of the measuring sections;

DESCRIPTION OF THE PREFERRED EMBODIMENTS

Figure 1:
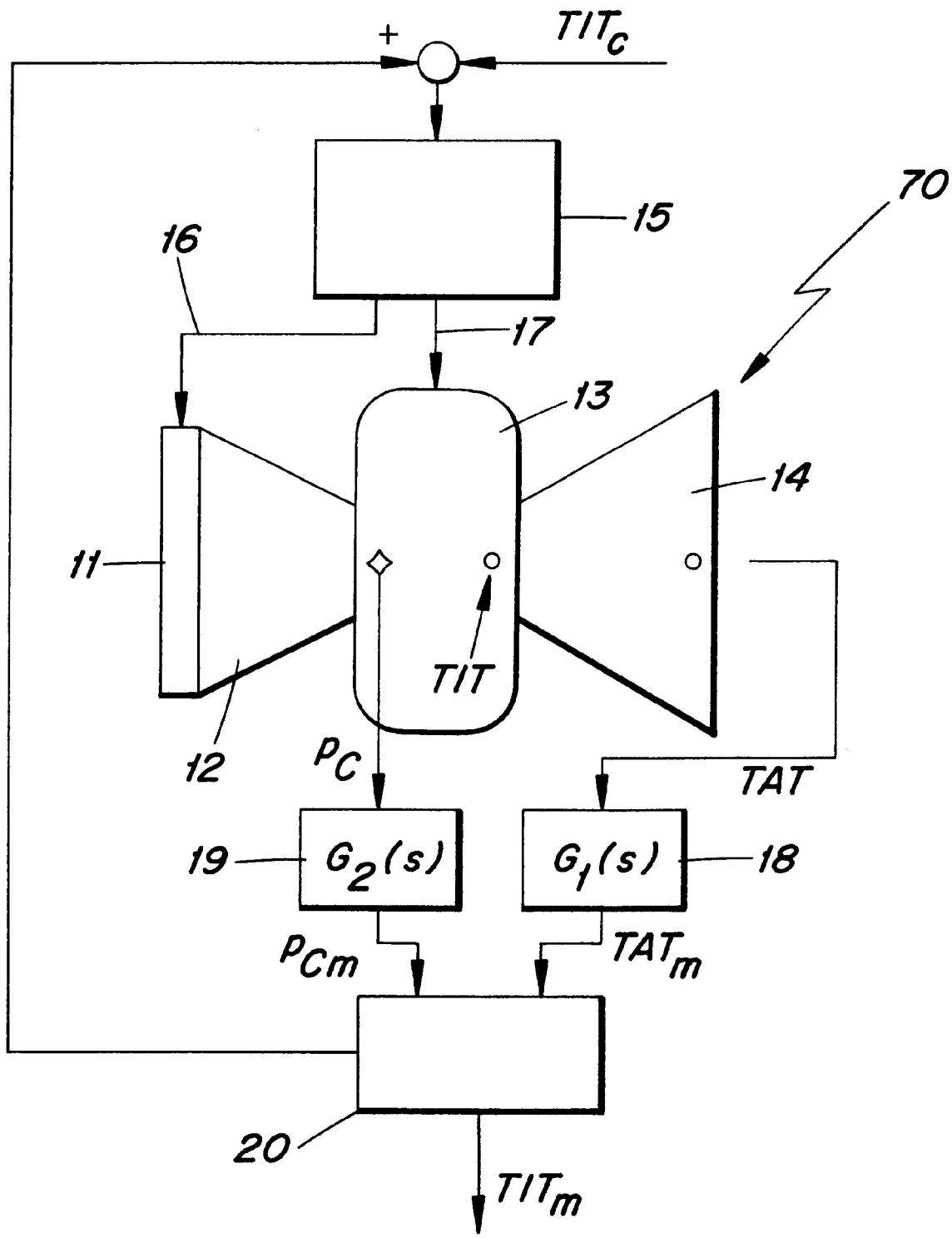
FIG. 1 shows the schematic construction of an uncorrected control system for controlling the turbine inlet temperature of a gas turbine.

Referring now to the drawings, wherein like reference numerals designate identical or corresponding parts throughout the several views, the essence of the present invention (in the practical case of the gas turbine 10 explained here) is a method of synchronizing the measurements $TAT_m$ and $p_{Cm}$ before the latter, with the use of the TIT formula (1.4), are used to calculate the pseudo measurement $TIT_m$ in order to achieve a high dynamic accuracy of the pseudo measurement $TIT_m$. The solution principles explained, however, can in principle be applied to all pseudo measurements which can be represented by a form according to (1.1).

To explain the solution to the problem according to the invention, it is assumed that the function f in the TIT formula is linear, i.e.:

$$TIT = aTAT + bp_C + c \tag{2.1}$$

with the constants a, b and c. It should be emphasized that the conclusions drawn further below and the results obtained apply to any linearizeable algebraic forms of the TIT formula and the pseudo measurements according to (1.1). The pseudo measurement belonging to the equation (2.1) is:

$$TIT_m = aTAT_m + bp_{Cm} + c. \tag{2.2}$$

The dynamic behavior of the measurements $TAT_m$ and $p_{Cm}$ or the associated measuring sections (18, 19 in FIG. 1) can be approximated with sufficient accuracy by two linear transfer functions $G_1(s)$ and $G_2(s)$, resulting in:

$$TAT_m = G_1(s)TAT \tag{2.3}$$

and $$p_{Cm} = G_2(s)p_C \tag{2.4}$$

where s designates the Laplace operator. For the practical case of the control of the gas turbine 10, the transfer functions $G_1(s)$ and $G_2(s)$ can be approximated by first-order filter functions:

$$G_1(s) = \frac{1}{sT_1 + 1} \quad \text{and} \tag{2.5}$$

$$G_2(s) = \frac{1}{sT_2 + 1} \tag{2.6}$$

where $T_1$ and $T_2$ are the dominating time constants of the respective measuring sections 19 and 18. For the subsequent analysis, $G_2(s)$ is expressed as a product of $G_1(s)$ and a ratio factor R(s):

$$G_2(s) = R(s)G_1(s) \tag{2.7}$$

with $$R(s) = \frac{G_2(s)}{G_1(s)}. \tag{2.8}$$

The transfer function R(s) describes a ratio of the dynamics of the pressure measurement and the temperature measurement or of the associated measuring sections. Inserting the equations (2.3) to (2.8) into (2.2) produces:

$$TIT_m = G_1(s)(aTAT + bR(s)p_C + c). \tag{2.9}$$

The following conclusions can be drawn from the equations (2.8) and (2.9):

(1) If the time constants $T_1$ and $T_2$ of the TAT and $p_C$ measurement sections are identical, the two measurements are synchronous. In this case, the pseudo measurement for TIT is:

$$TIT_m = G_1(s)(aTAT + bp_C + c) = G_1(s)TIT, \tag{2.10}$$

i.e., the result is equivalent to a direct TIT measurement with the dynamics $G_1(s)$. This is the desired behavior, since in this case the TIT formula correctly reproduces the measurement not only in a steady-state manner but also in a dynamic manner (for this see FIG. 3, from which it can be seen that, given the same time constants in the two measuring sections, there is a true first-order time delay between the actual value TIT and the pseudo measurement $TIT_m$). Although this result, strictly speaking, only applies to linear TIT formulae, it can also be applied to non-linear (linearizeable) pseudo measurements around a certain working point.

(2) If the time constants $T_1$ and $T_2$ differ, the TAT measurement and the $p_C$ measurement are asynchronous. In this case, R(s) 1 and the dynamic response of $TIT_m$ may differ completely (as shown in FIG. 2) from the desired behavior in the case of rapid transients. In this way, instability in the TIT closed loop may be triggered and the bandwidth of the gas-turbine control has to be reduced in order to avoid such rapid transients. As a result, the capacity of the gas turbine to rapidly change load or to work in frequency-controlled mode is impaired.

(3) The time constants $T_1$ and $T_2$ differ in virtually all cases on account of the different physical and technical processes forming the basis of the measuring sections. The synchronization of the measurements must therefore be achieved by suitable signal processing, so that the gas-turbine control (and other control systems) also works satisfactorily during transient actions.

The method according to the invention, then, provides for the time constants of the associated measuring sections to be largely matched in order to synchronize the measurements $TAT_m$ and $p_{Cm}$. To this end, it may be assumed that:

$$T_1 > T_2. \tag{3.1}$$

Typical values for these measurements are $T_1 = 8s$ and $T_2 = 2s$. The idea underlying the invention, then, is to make:

$$R(s) = 1 \tag{3.2}$$

for the frequency range relevant to the gas-turbine control by the existing measured values $TAT_m$ and/or $p_{Cm}$ being appropriately reprocessed.

For the one case, it follows from (2.7) that the measuring section 19 for $p_C$ has to be changed in such a way that its time constant assumes the value $T_1$. This can be achieved in a simple manner by the values $p_{Cm}$ being subjected to a filtering process with a lead-lag filter having the transfer or filter function:

$$G_3 = \frac{G_1(s)}{G_2(s)} = \frac{sT_2 + 1}{sT_1 + 1}. \tag{3.3}$$

This results in the corrected pressure measurement:

$$P_{Cm3} = G_3 p_{Cm}. \tag{3.4}$$

The TIT formula, which is dynamically corrected in this way and then fulfills (2.10), is:

$$TIT_m = aTAT_m + bp_{Cm3} + c. \tag{3.5}$$

The compensating filter $G_3(s)$ is a low-pass filter (see the filter characteristics in FIG. 4) and therefore suppresses measuring noise which could be produced by the lead element $(1 + sT_2)$. The dynamics of the pC measuring section are easily matched to the dynamics of the TAT measuring section by the correction.

On the other hand, however, it is also theoretically conceivable to improve (accelerate) the dynamics of the TAT measurement and thus match them to the dynamics of the $P_C$ measurement. Instead of $p_{Cm}$, $TAT_m$ would then be corrected or compensated according to the following specification:

$$TAT_{m4} = G_4(s)TAT_m \text{ with } G_4(s) = \frac{G_2(s)}{G_1(s)} = \frac{sT_1 + 1}{sT_2 + 1}. \tag{3.6}$$

The following is obtained as corrected TIT formula:

$$TIT_m = aTAT_{m4} + bp_{Cm} + c = G_2(s)TIT. \tag{3.7}$$

The advantage of this procedure is that the dynamics of the TIT pseudo measurement in this case are greater, since $T_2 < T_1$. On the other hand, however, the compensating filter $G_4(s)$ is a high-pass filter (see the filter characteristics in FIG. 5) and is therefore sensitive to high-frequency measuring noise. This disadvantage will generally preclude the use of the TIT formula according to (3.7).

Figure 6:
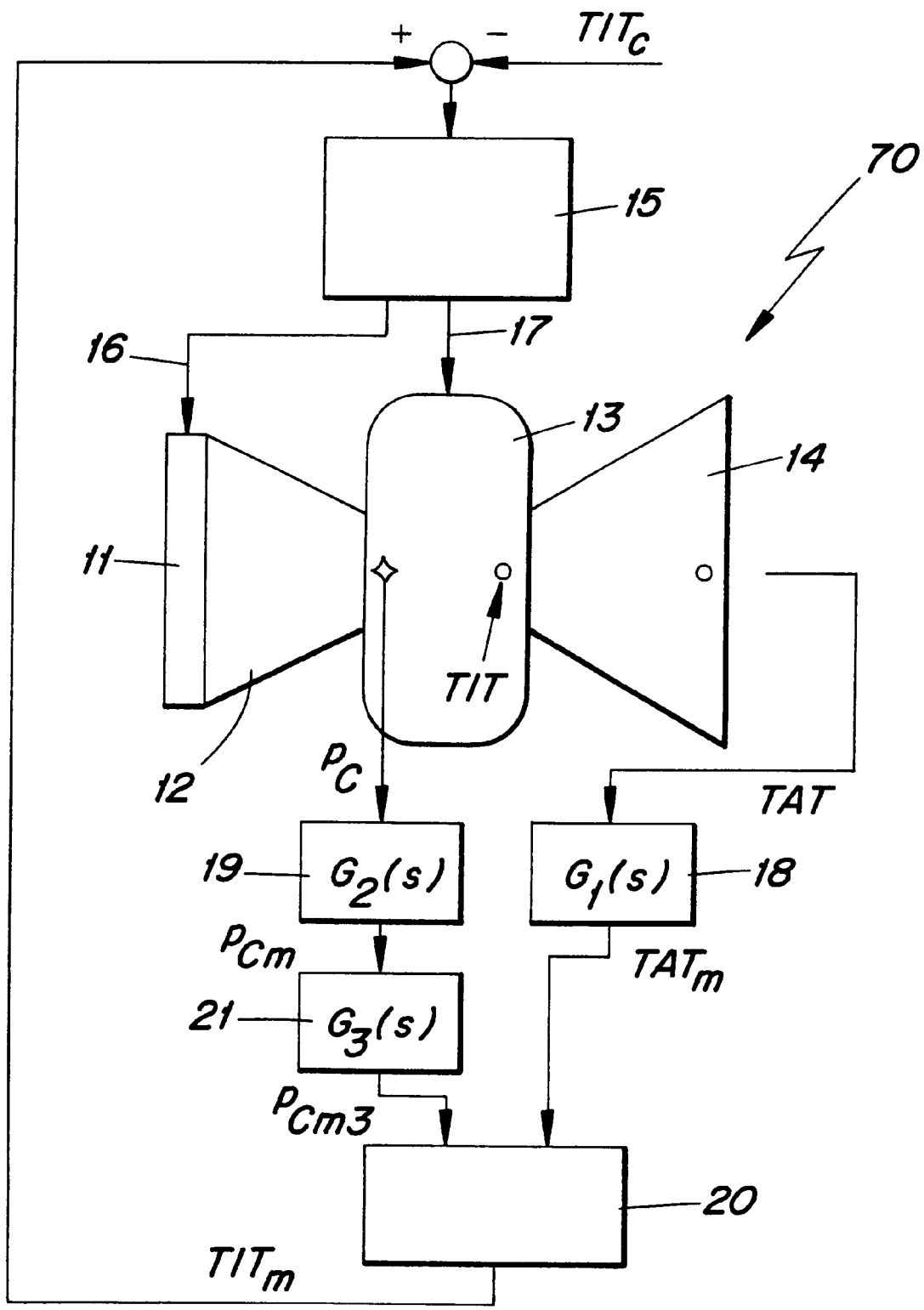
FIG. 6 shows the control scheme apparent from FIG. 1 with a correction in a preferred embodiment of the invention.

The corrected or compensated closed loop, comparable with FIG. 1, for the gas turbine and for the correction case according to equation (3.4) ($p_{Cm}$ correction) is reproduced in FIG. 6. Here, a correction element 21 having the transfer function $G_3(s)$ is connected downstream of the measuring section 19 for the pressure $p_C$, which correction element 21 corrects the $p_{Cm}$ values according to equation (3.4) and thus leads to matching of the time constants $T_1$ and $T_2$ and thus to synchronization of the two measuring sections.

Starting from the practical example, explained above, of the gas-turbine control, the correction action according to the invention can be expressed in its generalized form as follows:

Starting from the relationship:

$$y = \Sigma_i a_i x_i \tag{4.1}$$

and the associated steady-state equation for the pseudo measurement:

$$Y_m = \Sigma_i a_i x_{mi} \tag{4.2}$$

as well as the dynamics of the individual measuring sections:

$$x_{mi} = G_i(s) x_i \tag{4.3}$$

and the desired resulting dynamics $G_y(s)$ for $Y_m$, i.e.:

$$y_m = G_y(s)y \quad (4.4)$$

these dynamics can be achieved by using the following equation for the pseudo measurement:

$$Y_m = \Sigma_i a_i G_{mi}(s) x_{mi} \quad (4.5)$$

with $$G_{mi}(s) = \frac{G_y(s)}{G_i(s)}. \quad (4.6)$$

In this case, the correction elements $G_{mi}$ are only stable if the transfer functions $G_y(s)$ are stable and the transfer functions $G_i(s)$ have a minimum phase displacement. However, this leads to no problems in practice, since virtually all of the measuring sections are conceived in such a way that they have these properties.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for controlling a first temperature of a fuel burning device, comprising the steps of:
   measuring by first measuring means a second temperature of said fuel burning device which is lower than said first temperature;
   simultaneously measuring by second measuring means at least another variable of said fuel burning device;
   calculating from said measured values of said second temperature and said at least another variable a value of said first temperature;
   comparing said calculated value of said first temperature with a desired value of said first temperature; and
   controlling said fuel burning device in order to minimize a deviation between said calculated and desired value;
   wherein different time responses of said first and second measuring means are equalized prior to said calculating step.

2. Method as claimed in claim 1, wherein:
   correction means are used to equalize said different time responses; and
   said correction means comprise one or more correction elements which are arranged downstream of said first and/or second measuring means and correct said time responses of said first and/or second measuring means.

3. Method as claimed in claim 2, wherein:
   said first and second measuring means have first and second transfer functions, respectively; and
   each of said correction elements has a transfer function which, together with said transfer function of said associated measuring means, produces an overall transfer function which is at least approximately the same for said second temperature and said at least another variable.

4. Method as claimed in claim 1, wherein:
   said fuel burning device is a gas turbine and comprises a compressor with a compressor outlet, a burner and a turbine with a turbine inlet and a turbine outlet, and
   said first temperature is the turbine inlet temperature, said second temperature is the turbine outlet temperature, and said at least another variable is the compressor outlet pressure.

5. Method as claimed in claim 4, wherein:
   said gas turbine is controlled by controlling the mass flow of a fuel into said burner and/or the mass flow of the combustion air into said compressor.

6. Apparatus for controlling a first temperature of a fuel burning device, comprising:
   first measuring means for measuring a second temperature of said fuel burning device which is lower than said first temperature;
   second measuring means for measuring at least another variable of said fuel burning device;
   calculating means with at least two inputs and one output, said inputs of said calculating means being connected to said first and second measuring means;
   temperature controlling means with an input and at least one output, said input of said temperature controlling means being connected to said output of said calculating means, and said at least one output being connected to said fuel burning device by means of control line;
   wherein correction means are provided between said first and second measuring means and said calculating means for equalizing different time responses of said first and second measuring means.

7. Apparatus as claimed in claim 6, wherein:
   said correction means comprise one or more correction elements which are arranged between said first and/or second measuring means and said inputs of calculating means.

8. Apparatus as claimed in claim 7, wherein:
   said first and second measuring means have first and second transfer functions, respectively; and
   each of said correction elements has a transfer function which, together with said transfer function of said associated measuring means, produces an overall transfer function which is at least approximately the same for said second temperature and said at least another variable.

9. Apparatus as claimed in claim 8, wherein:
   said first transfer function has the form $G_1(s)=1/(sT_1+1)$ with a first time constant $T_1$ (s=Laplace operator), and the second transfer function has the form $G_2(s)=1/(sT_2+1)$ with a second time constant $T_2$, and wherein said calculated first temperature results linearly from said measured second temperature and said measured other variable.

10. Apparatus as claimed in claim 6, wherein:
    said fuel burning device is a gas turbine which comprises a compressor with a compressor inlet and outlet, a burner and a turbine with a turbine inlet and outlet,
    said first temperature is the turbine inlet temperature, said second temperature is the turbine outlet temperature, and said at least another variable is the compressor outlet pressure.

11. Apparatus as claimed in claim 10, wherein:
    said at least one control line is connected to means for controlling the mass flow of a fuel into said burner and/or the mass flow of the combustion air into said compressor.

* * * * *